(12) United States Patent
Chong et al.

(10) Patent No.: US 10,770,958 B2
(45) Date of Patent: Sep. 8, 2020

(54) ELECTRICAL MACHINE

(71) Applicant: ROLLS-ROYCE plc, London (GB)

(72) Inventors: Ellis F H Chong, Derby (GB); Shanmukha Ramakrishna, Singapore (SG); King Jet Tseng, Singapore (SG); Kin Hey Chu, Singapore (SG)

(73) Assignee: Rolls-Royce plc, London ( * ) Notice: Subject to any disclaimer, the term of this patent is extended or adjusted under 35 U.S.C. 154(b) by 157 days.

(21) Appl. No.: 16/169,117

(22) Filed: Oct. 24, 2018

(65) Prior Publication Data
US 2019/0157956 A1 May 23, 2019

(30) Foreign Application Priority Data

Nov. 23, 2017 (GB) .................................. 1719429.1

(51) Int. Cl.
| | |
|---|---|
| *H02K 21/04* | (2006.01) |
| *H02K 23/22* | (2006.01) |
| *H02K 9/10* | (2006.01) |
| *H02K 1/22* | (2006.01) |
| *H02K 9/16* | (2006.01) |
| *H02K 1/16* | (2006.01) |
| *H02K 1/27* | (2006.01) |
| *H02K 3/16* | (2006.01) |

(52) U.S. Cl.
CPC ............. *H02K 23/22* (2013.01); *H02K 1/165* (2013.01); *H02K 1/223* (2013.01); *H02K 1/278* (2013.01); *H02K 3/16* (2013.01); *H02K 9/10* (2013.01); *H02K 9/16* (2013.01); *H02K 2201/03* (2013.01)

(58) Field of Classification Search
CPC ..... H02K 1/223; H02K 21/042; H02K 21/044
See application file for complete search history.

(56) References Cited

U.S. PATENT DOCUMENTS

| 4,573,003 A | 2/1986 | Lipo |
| 2012/0248921 A1 | 10/2012 | Mipo et al. |

FOREIGN PATENT DOCUMENTS

| CN | 101719707 A | 6/2010 |
| CN | 205212670 U | 5/2016 |

(Continued)

OTHER PUBLICATIONS

Great Britain Search Report dated May 23, 2018, issued in GB Patent Application No. 1719429.1.

(Continued)

*Primary Examiner* — Ramon M Barrera
(74) *Attorney, Agent, or Firm* — Barnes & Thornburg LLP (57) ABSTRACT

A synchronous electrical machine includes a stator having a circumferential row of teeth carrying stator windings. The electrical machine further includes a coaxial rotor having a circumferential row of poles carrying field windings. Each pole has first and second side flanks and a tip surface which extends continuously there between to form an air gap to the teeth of the stator. On a transverse cross-section through the machine, one of the side flanks forms a leading edge of the pole, and the other side flank forms an opposite, trailing edge of the pole. Each pole carries a row of permanent magnets which extends across the tip surface from one of the side flanks to the other side flank, the permanent magnets compensating for armature magnetic reaction. The radial thickness of the permanent magnets increases smoothly with progressive distance across the tip surface from one of the side flanks to the other side flank.

8 Claims, 8 Drawing Sheets

(56) References Cited

FOREIGN PATENT DOCUMENTS

| | | |
|---|---|---|
| JP | S61116954 A | 6/1986 |
| JP | S63242157 | 10/1988 |

OTHER PUBLICATIONS

Li, et al., "Some Armature Reaction Compensation Methods Numerical Design of Experiments and Optimization for a Hybrid Excitation Machine", Electric Machines and Drives Conference, IEMDC'09, IEEE International , Miami, FL, 2009, pp. 832-838.

Extended EP Search Report dated Mar. 13, 2019 and issued in connection with EP Patent Appln. No. 18204315.8.

ELECTRICAL MACHINE

CROSS-REFERENCE TO RELATED APPLICATIONS

This application is based upon and claims the benefit of priority from British Patent Application No. GB 1719429.1, filed on 23 Nov. 2017, the entire contents of which are incorporated by reference.

BACKGROUND

Technical Field

The present disclosure relates to an electrical machine having means for compensating for armature magnetic reaction.

Description of the Related Art

Most synchronous motors are designed to operate at unity power factor. At unity power factor, the cross-magnetizing effect (armature magnetic reaction) on the air gap flux is at its strongest, with the leading edge of the pole being partly-magnetized and the trailing edge partly-demagnetized. Due to this effect, the machine incurs a net loss of flux.

Similar problems can be encountered with synchronous generators.

For electrical machines that rotate in a preferred direction, armature reaction mitigation schemes can be employed. One such scheme is to mount permanent magnets to tip surfaces of rotor poles as proposed in US 2012/0248921. However, this approach has a disadvantage in that if the magnets are not located at the correct positions and/or are too powerful, the line voltage total harmonic distortion (THD) will be worsened instead of being improved.

It would be desirable to provide more optimal armature reaction compensation.

SUMMARY

Accordingly, in a first aspect, the present disclosure provides a synchronous electrical machine including:

a stator having a circumferential row of teeth carrying stator windings;

a coaxial rotor having a circumferential row of poles carrying field windings;

wherein each pole has first and second side flanks and a tip surface which extends continuously there between to form an air gap to the teeth of the stator, on a transverse cross-section through the machine, one of the side flanks forming a leading edge of the pole, and the other side flank forming an opposite, trailing edge of the pole;

wherein each pole carries a row of permanent magnets which extends across the tip surface from one of the side flanks to the other side flank, the permanent magnets compensating for armature magnetic reaction; and wherein the radial thickness of the permanent magnets increases smoothly with progressive distance across the tip surface from one of the side flanks to the other side flank.

By smoothly increasing the radial thickness of the permanent magnets in this way, armature reaction compensation can be provided which mitigates the level of distortion of the air gap flux waveform to create a more sinusoidal air gap flux on loaded operation, thereby reducing line voltage THD and increasing operational efficiency. However, the smooth increase in thickness makes the approach much less dependent on correct magnet location and power selection. These benefits are particularly apparent when the machine is operated at unity power factor.

Advantageously, the rows of permanent magnets, or indeed the rotor as a whole, can be retrofitted into an existing machine, e.g. as an upgrade.

In a second aspect, the present disclosure provides gas-turbine engine including the electrical machine according to the first aspect.

In a third aspect, the present disclosure provides a marine propulsion unit including the electrical machine according to the first aspect. The marine propulsion unit can be an outboard drive unit.

However, other unidirectional rotational motoring/generating applications are also possible. For example, the electrical machine may be used as a power plant generator, a micro-grid generator, or a hydro-power generator (e.g. as part of a water turbine).

Optional features of the present disclosure will now be set out. These are applicable singly or in any combination with any aspect of the present disclosure.

The permanent magnets may occupy at least 80% of the total area of the tip surface, and preferably occupy at least 90% or at least 95% of the total area of the tip surface. More preferably, the permanent magnets may extend substantially continuously across the tip surface from one of the side flanks to the other side flank, although 100% occupation of the total area of the tip surface by the permanent magnets may be difficult to achieve e.g. if some of the tip surface is needed to accommodate fixing means, damping means etc. for the permanent magnets.

The radial thickness of the air gap may decrease smoothly with progressive distance across the tip surface from said one of the side flanks to said other side flank. This variation in air gap thickness can also help to compensate for armature magnetic reaction, although generally it is a weaker form of compensation than that provided by the permanent magnets.

For example, the electrical machine may be configured as a synchronous motor in which the stator and field windings are both energised to produce respective magnetic fields which interact to drive rotation of the rotor. In this case, the radially thinnest part of the permanent magnets is typically at the side flank forming the leading edge and the radially thickest part of the permanent magnets is typically at the side flank forming the trailing edge. Moreover, if the motor has a variable air gap, the radially thickest part of the air gap is typically at the side flank forming the leading edge and the radially thinnest part of the air gap is typically at the side flank forming the trailing edge.

As another example, the electrical machine may be configured as a synchronous generator in which rotation of the rotor combined with a magnetic field produced by synchronised energisation of the field windings induces a voltage in the stator. In this case, the radially thickest part of the permanent magnets is typically at the side flank forming the leading edge and the radially thinnest part of the permanent magnets is typically at the side flank forming the trailing edge. Moreover, if the motor has a variable air gap, the radially thinnest part of the air gap is typically at the side flank forming the leading edge and the radially thickest part of the air gap is typically at the side flank forming the trailing edge.

These two examples are not mutually exclusive, i.e. the electrical machine can operate at some times as a motor and at other times as a generator. However, for a given application (i.e. motor or generator), having the radial thickness of the permanent magnets increase from one of the side flanks to the other side flank has an effect of giving the machine a preferred direction of rotation for that application.

The electrical machine may further have a damper winding carried by the rotor. In case of a short-circuit in the stator windings, the damper winding can help to prevent an uncontrolled magnetic field produced by the stator windings from penetrating the permanent magnets.

DESCRIPTION OF THE DRAWINGS

Embodiments of the present disclosure will now be described by way of example with reference to the accompanying drawings in which.

DETAILED DESCRIPTION

Figure 1:
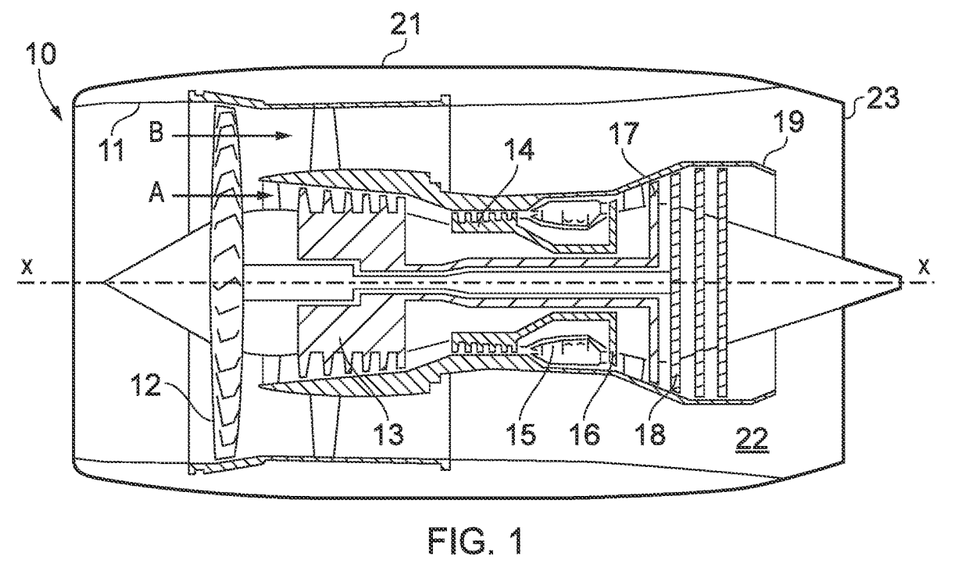
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
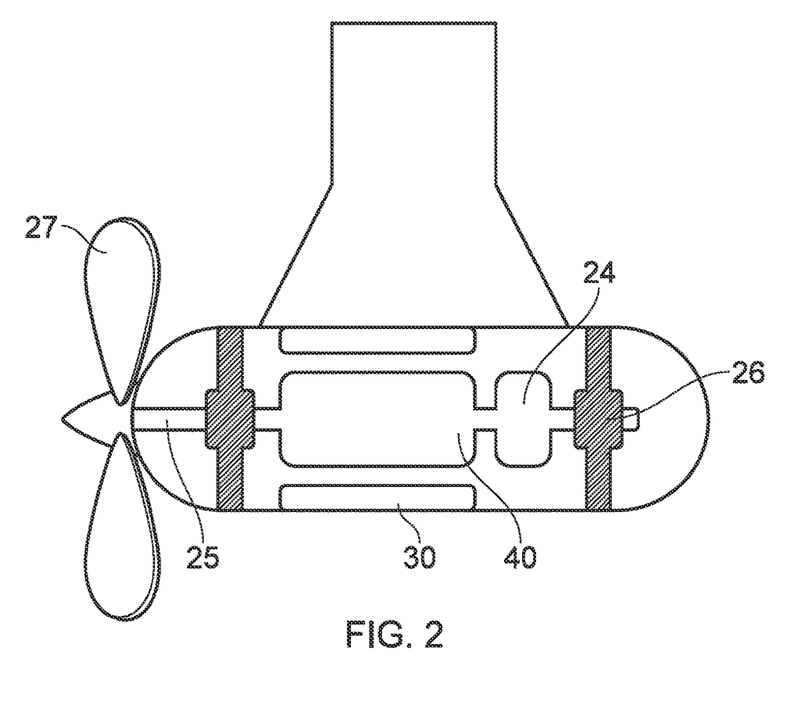
FIG. 2 shows schematically an outboard marine propulsion unit.

The gas turbine engine has at least one synchronous electrical machine according to the present disclosure. The electrical machine includes a stator having a circumferential row of teeth carrying stator windings, and a coaxial rotor having a circumferential row of poles carrying field windings. The electrical machine may operate as a generator powered by one of the above-mentioned interconnecting shafts, or as a starter motor. However, the electrical machine may be used in other applications, such as a motor in a marine propulsion system. For example, FIG. 2 shows schematically an outboard marine propulsion unit having a synchronous motor including a stator 30 and a rotor 40. The unit also has a brushless exciter 24, a shaft 25 for the rotor mounted on bearings 26, and a propeller 27 which turns with the rotor.

Finite element (FE) analyses were performed to demonstrate the improvement in armature magnetic reaction compensation that can be achieved by the electrical machine.

Figure 3:
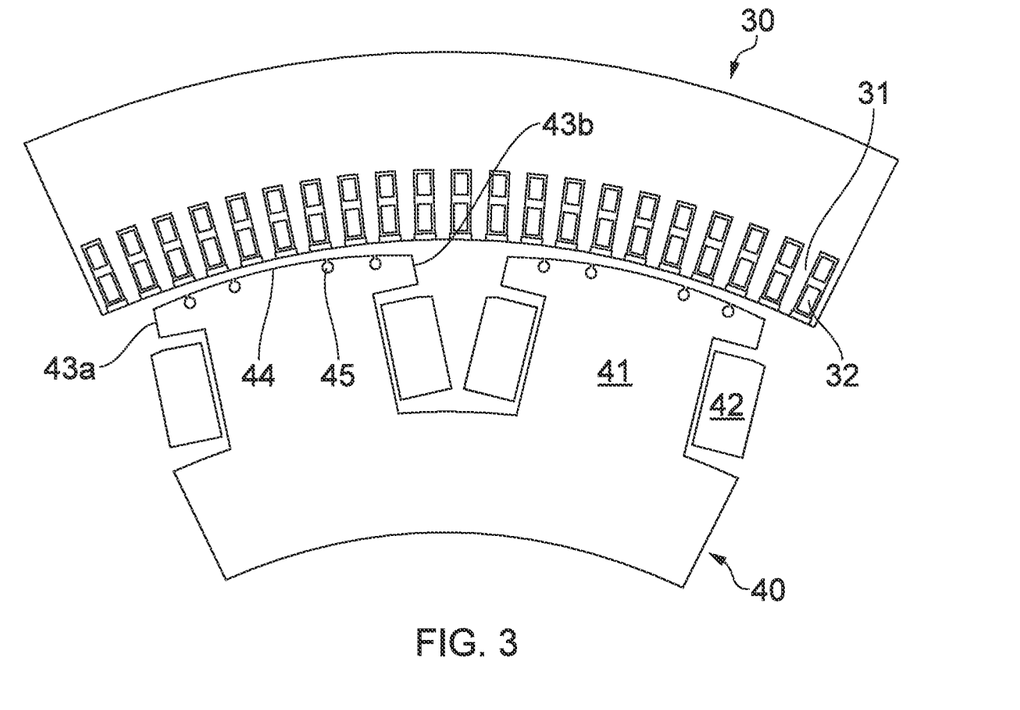
FIG. 3 shows a finite element (FE) geometry on a transverse cross-section through a first synchronous motor (Motor 1)

Thus FIG. 3 shows the FE geometry on a transverse cross-section through a first synchronous motor (Motor 1) having a stator 30 with teeth 31 and stator windings 32, and a rotor 40 with poles 41 and field windings 42. Each pole has a pair of side flanks 43a, 43b and a tip surface 44 which extends continuously there between to form an air gap to the teeth of the stator. Recesses 45 in the tip surface correspond to the positions of damper bars in the motors discussed below in respect of FIG. 4 and FIG. 5. The thickness of the air gap of each pole increases smoothly and symmetrically towards both side flanks 43a, 43b, giving the motor similar performance characteristics in both rotation directions such that either one of the side flanks can be the leading edge or the trailing edge.

Figure 4:
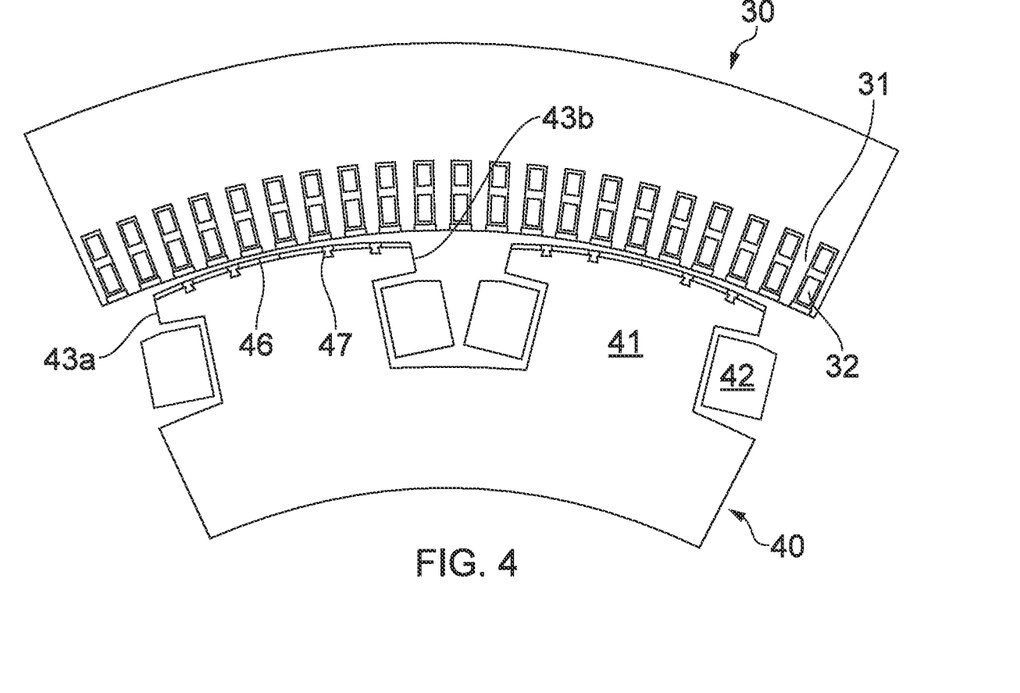
FIG. 4 shows the FE geometry on a transverse cross-section through a second synchronous motor (Motor 2)

FIG. 4 then shows the FE geometry on a transverse cross-section through a second synchronous motor (Motor 2) which is identical to Motor 1 except that the tip surface 44 now carries a row of permanent magnets 46 which extends across the tip surface from one of the side flanks 43a to the other side flank 43b. A row of damper bars 47, which are part of a damper winding (ammortisseur) of the motor, also extend across the tip surface. The damper winding, which includes end plates at the opposing axial end faces of the rotor 40 to which the damper bars are connected, is used in a conventional manner to smooth and accelerate starting, and to compensate for transient effects and unbalanced conditions. However, the damper winding can also protect the permanent magnets 46 during a short circuit event. In particular, stator currents can rise rapidly at the beginning of a short circuit. However, high frequency currents will induce currents in the damper bars, and a flux-screen can thus be formed which helps to prevent the stator magnetic field from penetrating the magnets 46, forcing it through leakage paths in the vicinity of the air gap.

The magnets 46 of each pole 41 are of uniform thickness across the entire tip surface 44, and the thickness of the air gap again increases smoothly and symmetrically towards both side flanks. Thus like Motor 1, Motor 2 has similar performance characteristics in both rotation directions.

Figure 5:
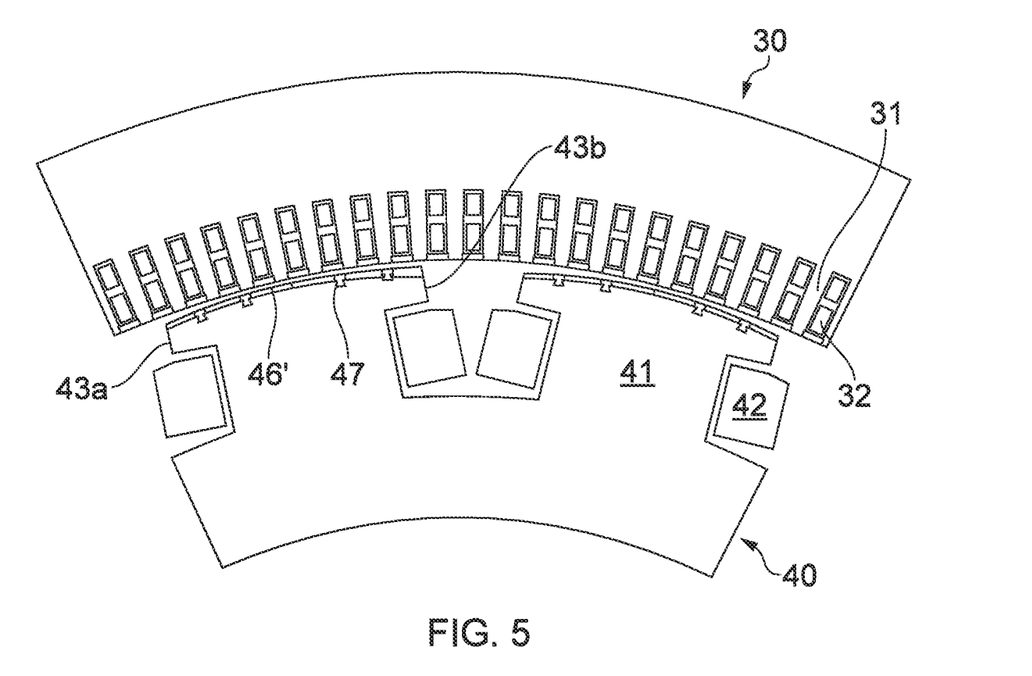
FIG. 5 shows the FE geometry on a transverse cross-section through a third synchronous motor (Motor 3)

Finally, FIG. 5 shows the FE geometry on a transverse cross-section through a third synchronous motor (Motor 3) which is similar to Motor 2 except that the magnets 46' and the air gap are modified such that the rotor 40 now has a preferred rotation direction (anti-clockwise as drawn in FIG. 5 for motoring action). This allows improvements in armature magnetic reaction compensation to be obtained. In particular, the magnets of each pole 41 now increase smoothly in radial thickness with progressive distance across the tip surface 44 from the leading edge side flank 43a to the trailing edge side flank 43b. In addition, the radial thickness of the air gap increases smoothly with progressive distance across the tip surface from the trailing side flank to the leading edge side flank.

Figure 6A:
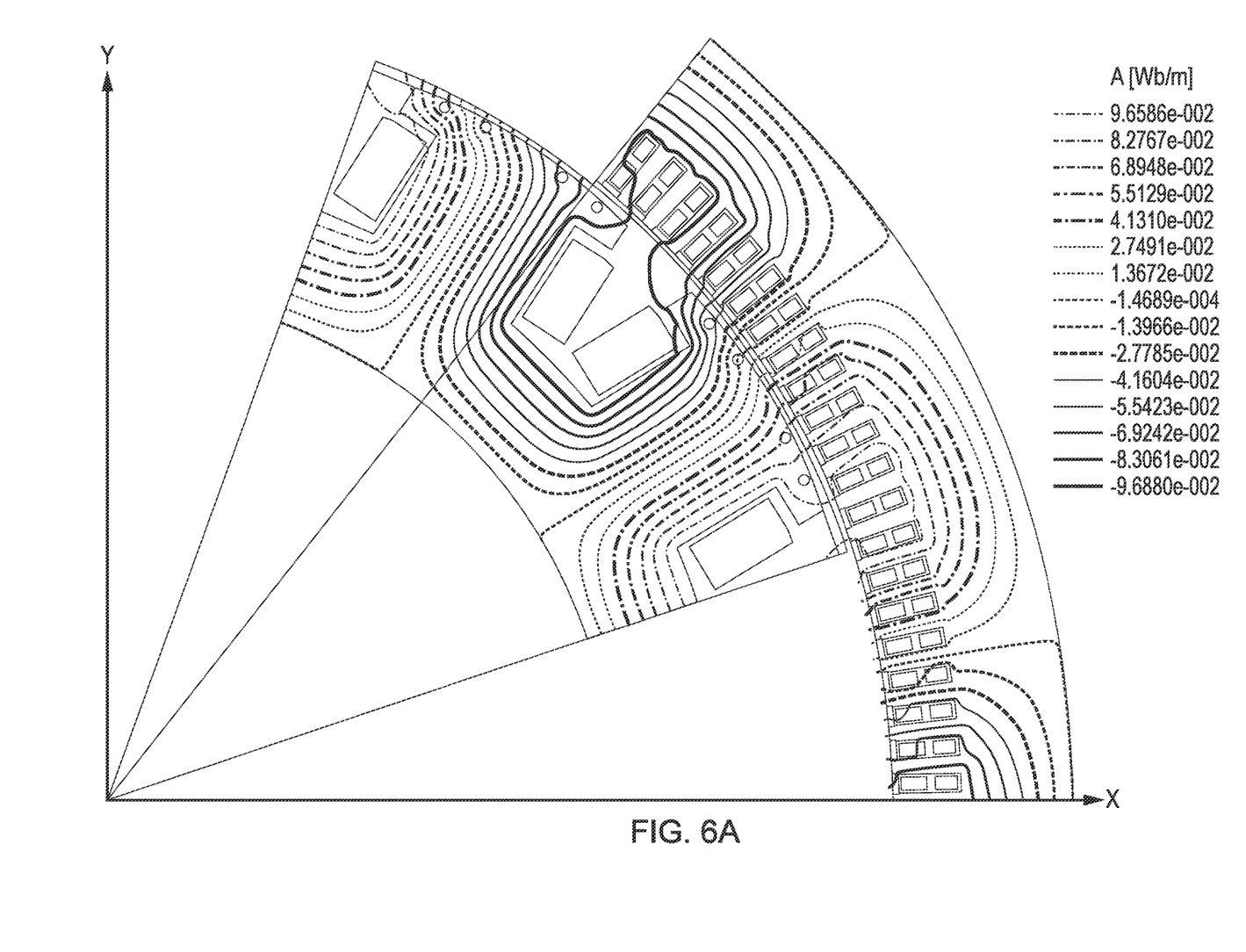
FIG. 6A shows a FE flux prediction for Motor 1.
Figure 6B:
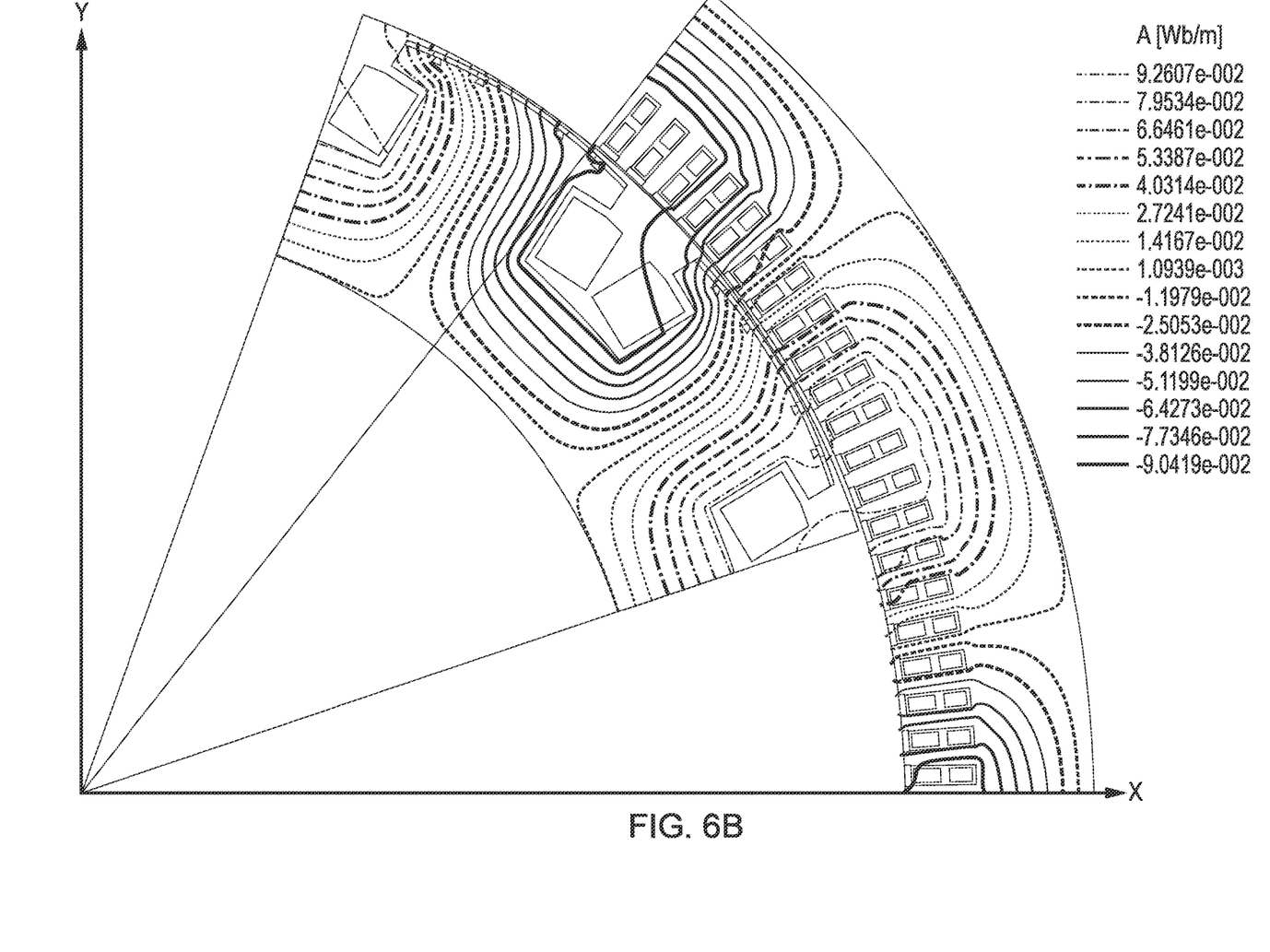
FIG. 6B shows a FE flux prediction for Motor 2.
Figure 6C:
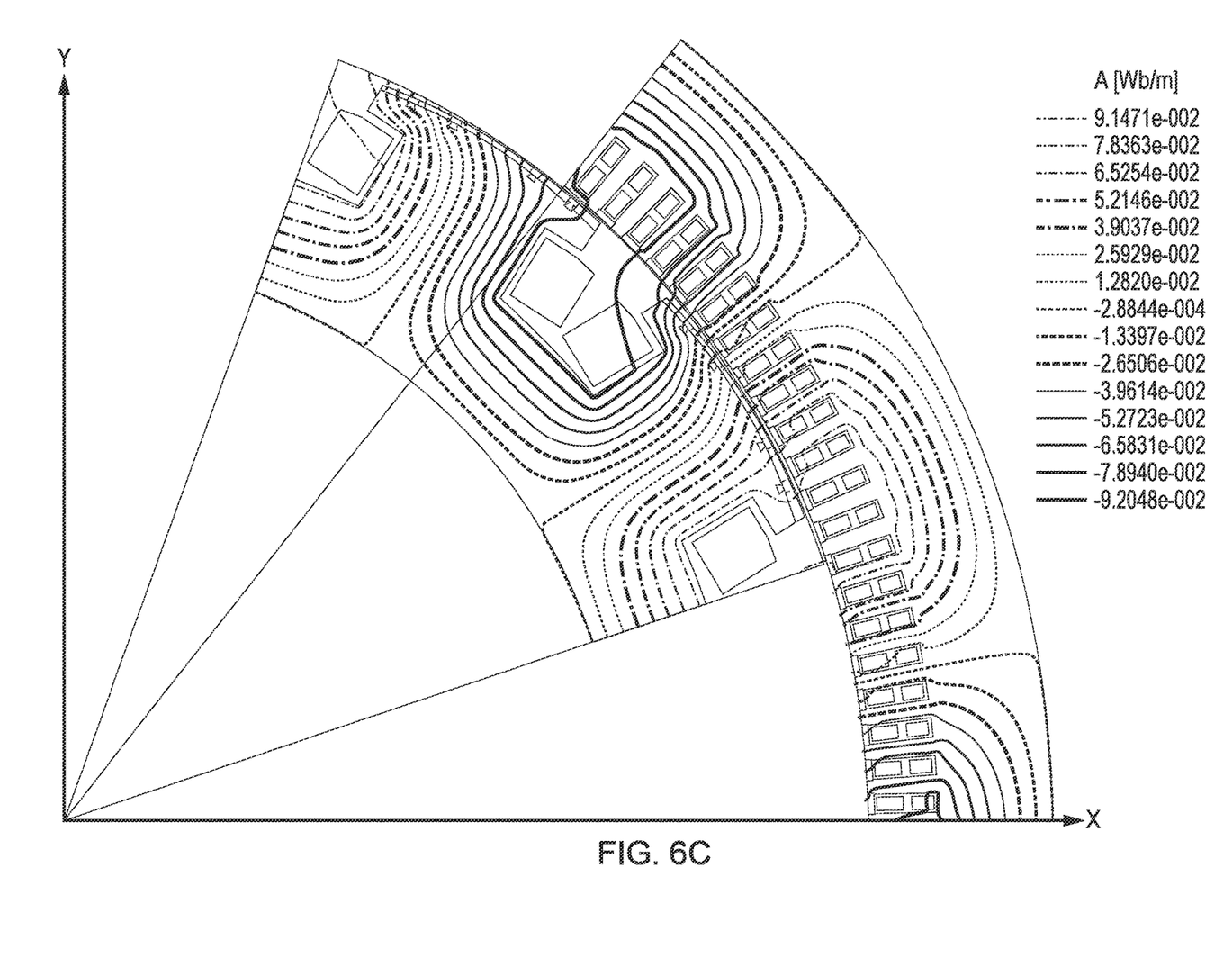
FIG. 6C shows a FE flux prediction for Motor 3.

FIG. 6A shows a FE flux prediction for Motor 1, FIG. 6B shows a FE flux prediction for Motor 2, and FIG. 6C shows a FE flux prediction for Motor 3, all at unity power factor when the cross-magnetizing effect on the air gap flux is at its strongest. The flux predictions show that the smoothly increasing magnet thickness of Motor 3 can compensate for armature reaction that otherwise produces a net loss of flux due to partial-magnetization of the leading edge of a pole and partial-demagnetization of the trailing edge.

Figure 7A:
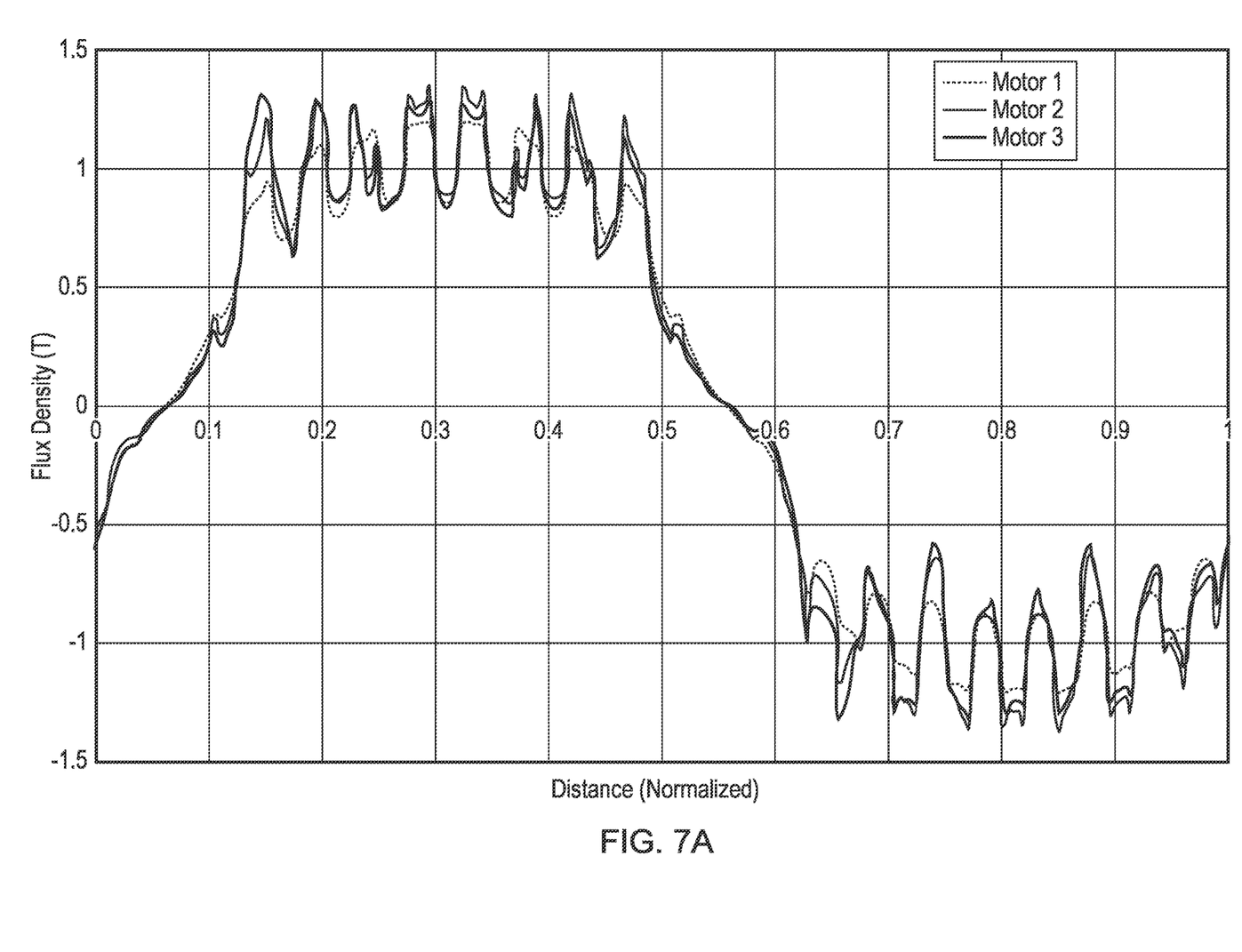
FIG. 7A shows plots of FE-modelled air gap flux density waveforms for Motors 1 to 3 at no-load operation.
Figure 7B:
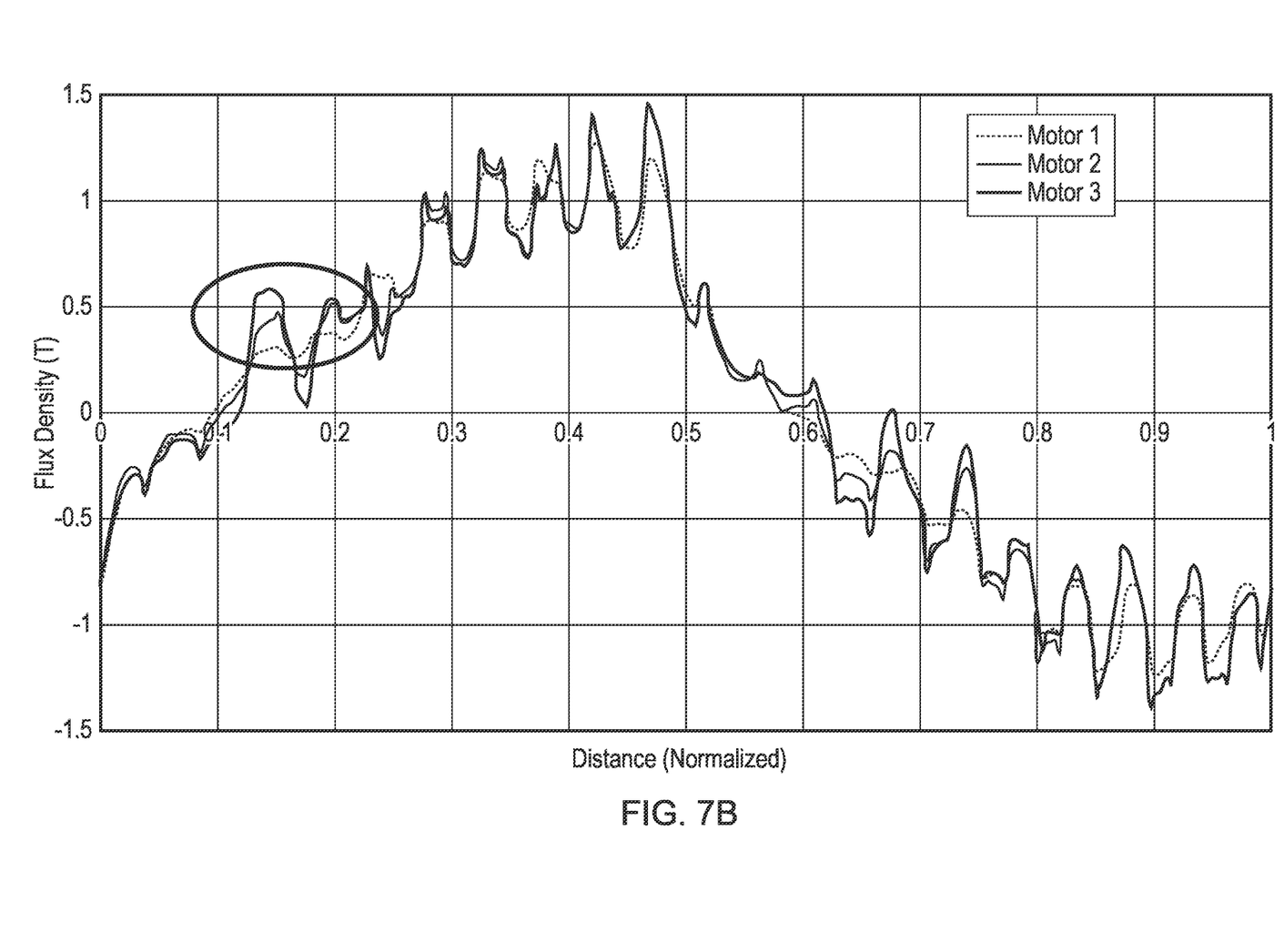
FIG. 7B shows plots of FE-modelled air gap flux density waveforms for Motors 1 to 3 at full-load operation.

The compensation is illustrated by FIG. 7A, which shows plots of FE-modelled air gap flux density waveforms for Motors 1 to 3 at no-load operation, and FIG. 7B which shows plots of FE-modelled air gap flux density waveforms for Motors 1 to 3 at full-load operation, all at unity power factor. At no-load (FIG. 7A) Motor 1 has the most sinusoidal air gap flux waveform, whereas Motor 3 has the least sinusoidal air gap flux waveform due to its asymmetrical permanent magnet distribution on its rotor. However, at full-load the air gap flux waveforms are distorted due to the effect of armature reaction. The trailing edge (ringed in FIG. 7B) of Motor 3 has a higher flux density compared to Motors 1 and 2 due to the increased permanent magnet thickness at the trailing edge, and now Motor 3 has the most sinusoidal air gap flux waveform. Moreover, the gradual and smooth variation in magnet thickness allows the total pole flux waveform to be improved, and helps to smooth our distortions and prevent abrupt changes to the magnetic flux, particularly at the trailing edge.

In addition, the armature reaction compensation provided by Motor 3 improves the line-line back electromotive force (EMF) harmonics at full load operation, as shown by Table 1 which provides the FE predicted back-EMF THDs of Motors 1 to 3 for the no-load and full-load operating conditions.

TABLE 1

|  | Motor 1 | Motor 2 | Motor 3 |
|---|---|---|---|
| No-load back-EMF THD (%) | 0.73912 | 0.95599 | 1.01244 |
| Full-load back-EMF THD (%) | 0.91306 | 0.82570 | 0.81209 |

To prevent damage to the permanent magnets due to centrifugal stress and physical impact, the magnets may be mounted inside armoured enclosures that can be made of high strength material such as nickel or titanium alloy. Such enclosures may employ modular designs which allows quick replacement of damaged magnets. They may also contain other elements, such as sensors and/or damper bars. Various fixing systems can be used to fix the magnets to the rotor, such as matching bolt holes in the magnets and rotor for installation of tie-rods, or dove tails or fir tree extensions to the magnets and correspondingly shaped recesses in the rotor. Additionally or alternatively, over-coating techniques, such as cold spray coating, can be used to adhere the magnets to the rotor.

Although described above in respect of a motoring action, the Motor 3 shown in FIG. 5 can also be used as a generator, but in this case the preferred rotation direction is clockwise as drawn in FIG. 5.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A synchronous electrical machine including:
   a stator having a circumferential row of teeth carrying stator windings;
   a coaxial rotor having a circumferential row of poles carrying field windings;
   wherein each pole has first and second side flanks and a tip surface which extends continuously there between to form an air gap to the teeth of the stator, on a transverse cross-section through the machine, one of the side flanks forming a leading edge of the pole, and the other side flank forming an opposite, trailing edge of the pole;
   wherein each pole carries a row of permanent magnets which extends across the tip surface from one of the side flanks to the other side flank, the permanent magnets compensating for armature magnetic reaction; and
   wherein the radial thickness of the permanent magnets increases smoothly with progressive distance across the tip surface from one of the side flanks to the other side flank.

2. An electrical machine according to claim 1, wherein the permanent magnets occupy at least 80% of the total area of the tip surface.

3. An electrical machine according to claim 1, wherein the radial thickness of the air gap decreases smoothly with progressive distance across the tip surface from said one of the side flanks to said other side flank.

4. An electrical machine according to claim 1 which is configured as a synchronous motor in which the stator and field windings are both energised to produce respective magnetic fields which interact to drive rotation of the rotor;
   wherein the radially thinnest part of the permanent magnets is at the side flank forming the leading edge and the radially thickest part of the permanent magnets is at the side flank forming the trailing edge.

5. An electrical machine according to claim 1 which is configured as a synchronous generator in which rotation of the rotor combined with a magnetic field produced by synchronised energisation of the field windings induces a voltage in the stator windings;
   wherein the radially thickest part of the permanent magnets is at the side flank forming the leading edge and the radially thinnest part of the permanent magnets is at the side flank forming the trailing edge.

6. An electrical machine according to claim 1 further having a damper winding carried by the rotor.

7. A gas-turbine engine including the electrical machine according to claim 1.

8. A marine propulsion unit including the electrical machine according to claim 1.

* * * * *